United States Patent [19]
Bennett

[11] 4,365,374
[45] Dec. 28, 1982

[54] HYDRAULICALLY OPERATED DOCKBOARD

[75] Inventor: David E. Bennett, Waukesha, Wis.

[73] Assignee: Kelley Company Inc., Milwaukee, Wis.

[21] Appl. No.: 175,143

[22] Filed: Aug. 4, 1980

[51] Int. Cl.³ .............................................. E01D 1/00
[52] U.S. Cl. .................................. 14/71.7; 91/189 A
[58] Field of Search ...................... 14/71.3, 71.7, 71.1; 91/189 A, 189 R, 189

[56] References Cited

U.S. PATENT DOCUMENTS

| Re. 14,230 | 12/1916 | Earl et al. | 91/189 A |
|---|---|---|---|
| 2,644,971 | 7/1953 | Rowe | 14/71.7 |
| 2,881,457 | 5/1959 | Rogers | 14/71.7 |
| 2,997,988 | 8/1979 | Dorkins | 91/520 |
| 3,201,814 | 8/1965 | Le Clear | 14/71.7 |
| 3,290,709 | 12/1966 | Whitenack | 14/71.7 |
| 3,290,710 | 12/1966 | Whitenack, Jr. | 14/71.7 |
| 3,345,665 | 10/1967 | Anderson | 14/71.7 |
| 3,388,413 | 6/1968 | Clarke | 14/71.7 |
| 4,068,338 | 1/1978 | Artzberger | 14/71.3 |
| 4,081,874 | 4/1978 | Artzberger | 14/71.7 |
| 4,110,860 | 9/1978 | Neff et al. | 14/71.7 |

FOREIGN PATENT DOCUMENTS

| 717691 | 9/1965 | Canada | 14/71.3 |
|---|---|---|---|
| 723723 | 11/1952 | United Kingdom | 14/71.1 |

OTHER PUBLICATIONS

"Kelley Dyna-Load Hydraulic Dock Leveler," 5155, 4/1/79.

*Primary Examiner*—Nile C. Byers, Jr.
*Attorney, Agent, or Firm*—Andrus, Sceales, Starke & Sawall

[57] ABSTRACT

A hydraulically operated dockboard comprising a ramp which is hinged at its rear edge to the frame of the dockboard, and a lip is hinged to the forward edge of the ramp and can be pivoted between a downwardly hanging pendant position and an extended position. A main hydraulic cylinder unit interconnects the frame and the ramp, and by operating the cylinder unit the ramp can be pivoted upwardly from a horizontal cross traffic position to an upwardly inclined position. As the ramp approaches its fully raised position, hydraulic fluid is conducted from the main cylinder unit to a lip lifting cylinder which interconnects the ramp and the lip. Introducing fluid to the lip lifting cylinder will act to pivot the lip to the extended position. When operation of the main hydraulic unit is discontinued, the combined weight of the ramp and the lip will cause the ramp to descend, and when the ramp descends to a predetermined position, the hydraulic fluid will return from the lip lifting cylinder to the main cylinder unit to thereby permit the lip to pivot by gravity to the pendant position.

13 Claims, 6 Drawing Figures

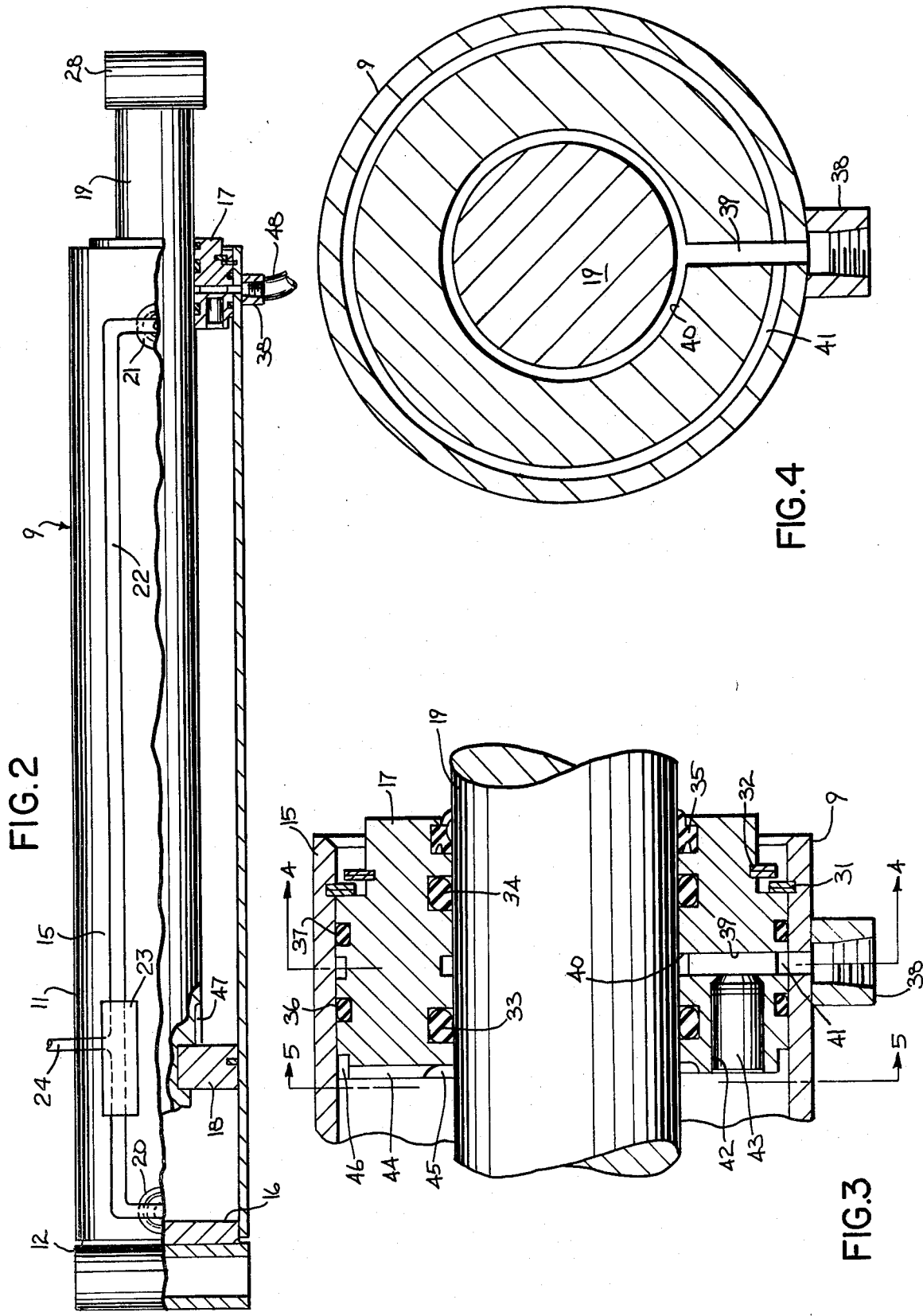

HYDRAULICALLY OPERATED DOCKBOARD

BACKGROUND OF THE INVENTION

A pit-mounted dockboard is a common type which is mounted in a pit or depression in the loading dock. The dockboard includes a ramp which is pivoted at its rear edge to the frame or supporting structure, and a lip is hinged to the forward edge of the ramp and is movable between a downwardly hanging pendant position and an extended position where it forms an extension to the ramp. When in use, the extended lip will engage the bed of a carrier or truck positioned in front of the dock to bridge the gap between the dock and the truck. After the loading operation is completed and the truck pulls away from the dock, the lip will pivot downwardly to the pendant position.

In a conventional hydraulically operated dockboard, a hydraulic cylinder unit interconnects the frame and the ramp. By operating the cylinder unit to extend the piston rod or ram, the ramp will be pivoted upwardly to an inclined position. Hydraulic dockboards also include a mechanism for lifting the lip from the downwardly hanging pendant position to the extended position as the ramp is elevated. In some types of hydraulic dockboards, a mechanical linkage is used to raise the lip, while in other hydraulic dockboards, a separate hydraulic cylinder unit is employed. In the latter situation, where a separate lip lifting cylinder is utilized, the lip lifting cylinder can be operated through separate manual controls, or in other cases, the lip lifting cylinder is interlocked with operation of the main cylinder so that hydraulic fluid will be supplied to the lip lifting cylinder from the hydraulic system when the ramp is elevated to a predetermined position.

SUMMARY OF THE INVENTION

The invention is directed to an improved hydraulically operated dockboard incorporating a main lifting cylinder and a lip lifting cylinder, in which the flow of hydraulic fluid to the lip lifting cylinder is controlled by, and supplied through, the main cylinder. More specifically, when the main hydraulic cylinder is operated to raise the ramp, the piston rod of the cylinder is extended, and as the piston approaches the end of its stroke of travel, a passage is opened which supplies hydraulic fluid from the end of the main lift cylinder to the lip lifting cylinder to thereby operate the lift lifting cylinder and pivot the lip from the pendant position to the extended position.

When the flow of pressurized hydraulic fluid to the main cylinder is terminated, the combined weight of the ramp and the lip will cause the cylinder unit to retract and the ramp will pivot downwardly until the extended lip engages the bed of a truck or carrier. The rate of ramp descent is controlled by a restrictive orifice in the return line to the reservoir, resulting in pressure being maintained in the main lift cylinder and the lip lifting cylinder until the descent of the ramp is arrested.

When the extended lip engages the bed of the truck, the pressure in both the lift cylinder and the lip lifting cylinder drop to near ambient pressure. After the loading operation has been completed and the truck pulls away from the loading dock, the ramp will again descend by gravity and the hydraulic back pressure is re-established to prevent the lip from moving to its pendant position until descent of the ramp has been stopped by engagement of the ramp with a fixed support. When the downward movement of the ramp has terminated, the hydraulic back pressure will be reduced in the lip lifting cylinder, allowing the hydraulic fluid to flow from the lip lifting cylinder through a check valve in the main cylinder and back to the reservoir. This action cushions the downward movement of the lip and provides a more silent operation.

The hydraulically operated dockboard of the invention is a simplified construction in which the valving for supplying the hydraulic fluid to the lip lifting cylinder is located within the main cylinder. This results in a more compact and uncluttered unit which minimizes external hydraulic lines and valving.

With the hydraulic dockboard of the invention, no mechanical lip lock is required to retain the lip in the extended position. The back pressure of the main cylinder will retain the lip in the extended position until the ramp descends into engagement with a fixed support.

Other objects and advantages will appear in the course of the following description.

DESCRIPTION OF THE DRAWINGS

The drawings illustrate the best mode presently contemplated of carrying out the invention.

In the drawings:

FIG. 2 is a longitudinal section of the main lift cylinder;

FIG. 3 is a fragmentary enlarged view of the head of the main lift cylinder;

FIG. 4 is a section taken along line 4—4 of FIG. 3;

DESCRIPTION OF THE PREFERRED EMBODIMENT

Figure 1:
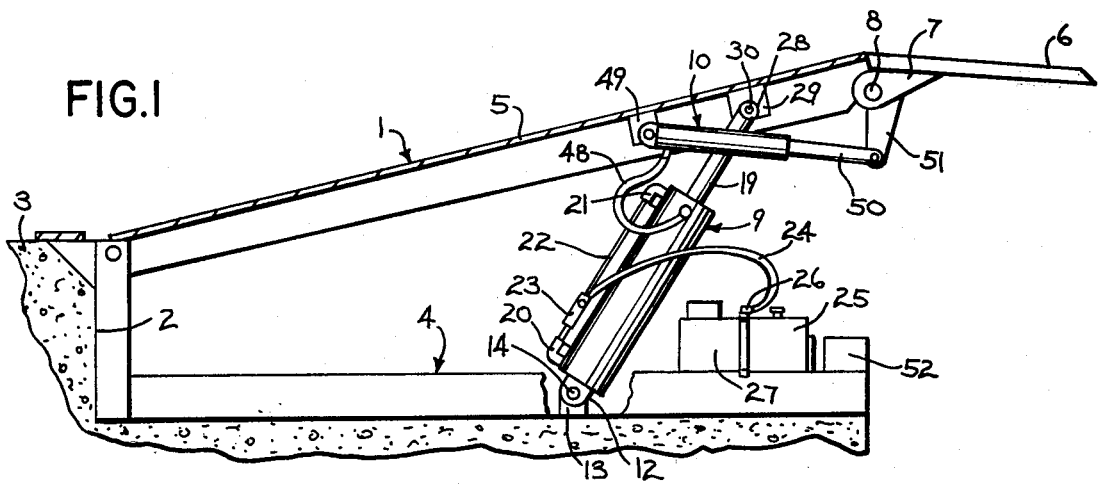
FIG. 1 is a side elevation of the hydraulic dockboard of the invention with the ramp in the upwardly inclined position and the lip in the extended position.
Figure 5:
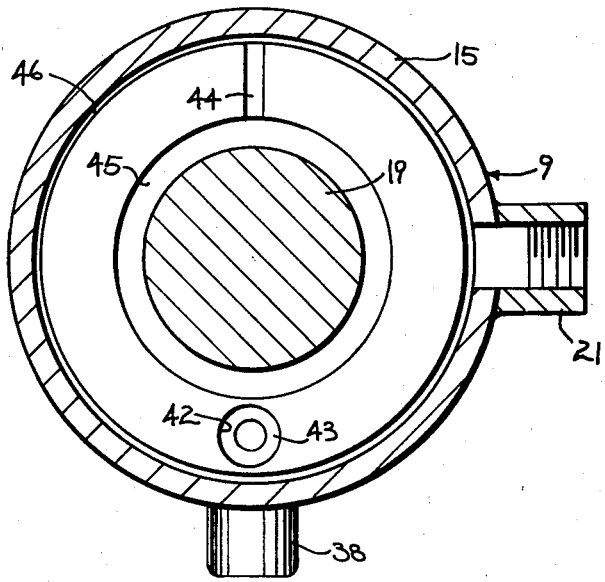
FIG. 5 is a section taken along line 5—5 of FIG. 3.

FIG. 1 shows a dockboard 1 which is mounted within a pit 2 or depression in a loading dock 3. The dockboard is adapted to bridge the gap between the loading dock and the bed of a truck or carrier which is located in front of the dockboard.

The dockboard 1 includes a supporting structure or frame 4, and the rear end of a ramp or deck plate 5 is pivoted to the supporting structure, so that the ramp is movable from a generally horizontal cross traffic position, where the ramp is generally flush with the upper surface of the dock 3, to an upwardly inclined position, as shown in FIG. 2.

Hinged to the forward edge of the ramp 5 is a lip 6 which is movable between a downwardly hanging, pendant position and an outwardly extended position, as shown in FIG. 2, where the lip forms an extension to the ramp. The lip 6 is hinged to the ramp 5 by a series of lugs 7 which are connected to the underside of the lip and are mounted for rotation on a hinge pin 8 which is connected to the forward end of the ramp. The construction of the frame, ramp and lip is conventional and is of a type such as shown in U.S. Pat. No. 4,068,338.

In accordance with the invention, a main lift cylinder 9 interconnects the supporting structure 4 and the ramp 5 serves to pivot the ramp from the horizontal cross traffic position to the upwardly inclined position, while a second lip lifting cylinder 10 interconnects the ramp and the lip and acts to move the lip to the extended position.

The main lift cylinder unit 9 comprises a cylinder 11 having a tubular sleeve 12 at its lower end which is pivoted to lugs 13 on the supporting structure 4 through a pin 14. The cylinder 11 is composed of a generally cylindrical outer shell 15, the ends of which are enclosed by a lower head 16 and an upper head 17. A piston 18 is mounted for sliding movement within the shell 15 and carries a piston rod 19 that extends through head 17. Hydraulic fluid is supplied to the lower end of the cylinder 11 through fitting 20 and is supplied to the upper end of the cylinder through a fitting 21. A line 22 connects the fittings 20 and 21 and a velocity fuse 23 is located in line 22. The velocity fuse 23 is of conventional construction and serves to prevent rapid descent of the ramp 5 in the event a truck pulls away from the loading dock when an added load, such as a fork lift truck, is on the ramp.

Line 24 connects the line 22 with a reservoir 25 for hydraulic fluid which is mounted on the supporting structure 4 and an orifice 26 of conventional construction is located in line 24. The orifice 26 provides free flow of hydraulic fluid from the reservoir 25 through the line 24 but provides a restriction to flow in the opposite direction.

A conventional motor pump unit 27 is mounted adjacent the reservoir 25 and when operated, serves to deliver hydraulic fluid from the reservoir through line 24 and line 22 to the fittings 20 and 21 of the cylinder.

As illustrated in FIG. 1, the upper end of the piston rod carries sleeve 28 which is connected to lug 29 located on the underside of the ramp 5 by a pin 30.

The construction of the upper head 17 is best illustrated in FIG. 3. The head is retained within the shell 15 of the cylinder by a pair of retaining rings 31 and 32. Ring 31 is engaged within a groove in the inner surface of shell 15 and prevents outward movement of the head from the shell, while retaining ring 32 is engaged within a groove in the head and through engagement with ring 31 prevents inward axial movement of the head relative to shell 15.

The head 17 is sealed to the rod 19 by a pair of O-rings 33 and 34 and a lip seal 35. In addition, the head 17 is sealed to the shell by O-rings 36 and 37.

As shown in FIG. 3, a fitting 38 is connected to the cylinder 11 and communicates with a radial passage 39 in head 17. The ends of the radial passage 39 communicate with an inner annular passage 40 and an outer annular passage 41. Extending longitudinally between the radial passage 39 and the inner face of the head 17 is a longitudinal passage 42 and a conventional cartridge type check valve 43 is mounted within the passage 42. The check valve 43 permits free flow of fluid in a direction from the passage 39 to the interior of the cylinder 11, but prevents flow of fluid in the opposite direction.

The inner face of head 17 is provided with a radial groove 44 which communicates with an inner annular recess 45 and outer annular recess 46. The outer recess 46 communicates with fitting 21.

Figure 6:
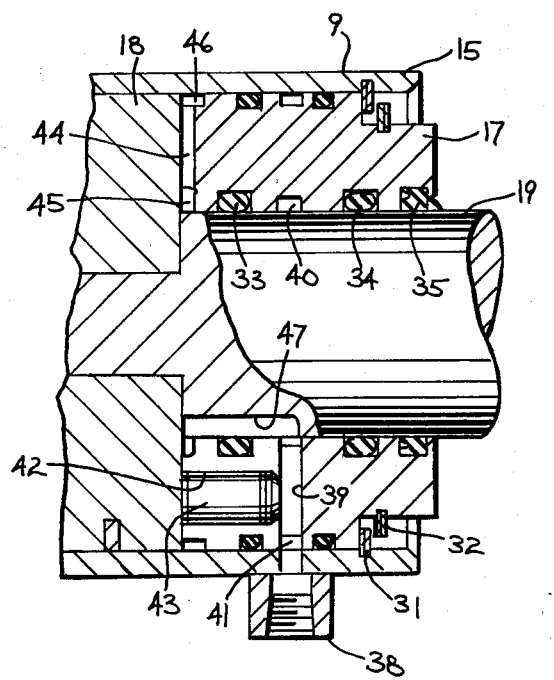
FIG. 6 is a view similar to FIG. 3 showing the delivery of hydraulic fluid from the main cylinder unit to the lip lifting cylinder.

When it is desired to raise the ramp to its upwardly inclined position, the operator pushes an "UP" button on a control panel thereby operating the motor pump unit 27 to supply hydraulic fluid from the reservoir 25 through line 24 to the line 22 and fittings 20 and 21. The pressure on both sides of the piston will be balanced, but due to the fact that the pressure acts against a larger surface area on the lower face of the piston than on the upper face, the differential in force will move the piston 18 upwardly to extend the piston rod 19 and pivot the ramp 5 to the upwardly inclined position, as shown in FIG. 1. As the piston 18 moves upwardly, fluid will be supplied from the reservoir 25 through line 24 and velocity fuse 23 to the fitting 20 at the lower end of the cylinder and fluid will also be displaced from the upper end of the cylinder 9 through line 22 and velocity fuse 23 to the fitting 20. As the piston 18 approaches the upper head 17, a slot 47 formed in the rod 19 adjacent the piston 18 will move into alignment with the upper head 17, as illustrated in FIG. 6, and will establish communication between the annular passage 45 and the radial passage 39 and fitting 38, so that the hydraulic fluid can then flow from the fitting 21, into outer recess 46, through radial groove 44 to inner recess 45 and then through slot 47 and radial passage 39 to line 48 and hence to the lip lifting cylinder 10 to extend the lip 6.

As shown in FIG. 1, one end of cylinder 10 is pivotally connected to lugs 49 which extend downwardly from the undersurface of the ramp and a piston rod or ram 50 is slidably mounted within the cylinder and is pivotally connected to a lip lug 51 which is mounted on the lower surface of the lip. By introducing hydraulic fluid through line 48 into the cylinder 10, the rod 50 will be extended to thereby pivot the lip from the downwardly hanging pendant position to the extended position.

OPERATION

The ramp 5 will normally be stored in the horizontal cross traffic position. After a truck has pulled into position in front of the dock 3 for loading, the operator will push the "UP" button on the control panel which operates the motor pump unit 27 to supply pressurized hydraulic fluid from the reservoir 25 through lines 24 and 22 to both ends of the cylinder 11. Due to the difference in force applied to opposite faces of piston 18, as previously described, the piston 18 will be moved upwardly in the cylinder 11 to extend the piston rod 19, causing the ramp 5 to move to the upwardly inclined position. As the piston moves upwardly, the fluid in the portion of the cylinder above the piston will be displaced through line 22 to the lower portion of the cylinder, beneath the piston.

As the piston 18 approaches the upper head 17, the slot 47 in the rod 19 will establish communication between the interior of the cylinder and the radial passage 39, thereby permitting hydraulic fluid to flow from the main cylinder 11 through line 48 to the lip lifting cylinder unit 10, to extend rod 50 and pivot the lip to the extended position. In practice, the lip lifting action will occur when the ramp is about 1 inch from its uppermost position. As the entire hydraulic system is pressurized, the added volume of fluid to be supplied to the lip lifting cylinder will be delivered from the reservoir 25 through fitting 21 to the main cylinder 9 and then to the lip lifting cylinder.

With the ramp fully elevated, the operator will then disengage the "UP" button on the control panel, discontinuing the flow of pressurized fluid to the main lift cylinder unit. Due to the combined weight of the ramp and the lip, the ramp will descend by gravity and the hydraulic fluid located within the cylinder 11 beneath the piston 18 will flow through the line 22 to the upper end of the cylinder, as the piston 18 descends within the cylinder 11. Because the effective area of the cylinder beneath the piston is greater than that above the piston, a portion of the displaced fluid from the lower end of the cylinder will be returned to the reservoir 25 through line 24. In passing through the orifice 26 a back pressure is generated which is sufficient to prevent the lip lifting cylinder unit 10 from retracting. Thus, as the ramp descends, the lip will be retained in the extended position.

When the lip is lowered into engagement with the bed of a truck or carrier, both the ramp and the lip are then supported by the trailer bed and the pressure in both the main cylinder unit 9 and the lip lifting cylinder 10 will drop to near ambient pressure.

After the loading operation has been completed and the truck pulls away from the dock, the weight of the ramp and the lip will again cause the ramp to descend. Because the lip is checked by back pressure in the hydraulic system from falling rapidly, it will remain in a roughly extended position. In this position, cams located on the underside of the lip hold the cross traffic legs, not shown, in a rearward position allowing the ramp 5 to fall to a full below dock position and be stopped by the fixed supports 52 which extend upwardly from the support structure 4. Once the downward movement of the ramp has been arrested, the back pressure in the main lift cylinder unit 9 is released allowing hydraulic fluid to flow from the lip lifting cylinder 10 through line 48 and into the radial passage 39. At this time, the piston 18 is out of proximate relation to head 17 so that slot 47 will not provide communication between the interior of the cylinder and passage 39. However, the fluid will flow from passage 39 through the check valve 43 into the cylinder and then through the lines 22 and 24 to the reservoir 25. The orifice 26 again provides a restriction to the return flow to provide controlled downward movement of the lip to thereby cushion the lip descent.

The invention provides a hydraulically operated dockboard construction in which the valving for supplying hydraulic fluid to the lip lifting cylinder is an integral part of the main lift cylinder. This arrangement simplifies the overall construction resulting in reduced cost and greater efficiency.

Various modes of carrying out the invention are contemplated as being within the scope of the following claims particularly pointing out and distinctly claiming the subject matter which is regarded as the invention.

I claim:

1. A hydraulically operated dockboard, comprising a supporting structure, a ramp structure hinged at its rear edge to the supporting structure and movable between a generally horizontal position and an upwardly inclined position, a lip hinged to the forward edge of the ramp structure and movable between a downwardly hanging pendant position and an outwardly extended position, a first hydraulic cylinder unit interconnecting the ramp structure and the supporting structure and comprising a first cylinder and first piston means slidable within the cylinder, said first piston means includes a rod extending through a head of the first cylinder, said first cylinder being pivotally connected to one of said structures and said first piston means being pivotally connected to the other of said structures, a second hydraulic cylinder unit interconnecting the ramp structure and the lip, means for supplying hydraulic fluid under pressure to the first cylinder unit to extend said piston means and elevate the ramp structure, a conduit connecting said head with the second cylinder unit, and means for establishing communication between said conduit and the end of the first cylinder adjacent said head as the first piston means approaches said head to thereby direct hydraulic fluid from said first cylinder through said conduit to said second cylinder unit to pivot the lip to the extended position.

2. The dockboard of claim 1, and including means responsive to the ramp being lowered to a fixed position for returning hydraulic fluid from the second cylinder unit through said conduit to the first cylinder to thereby enable the lip to lower by gravity to the pendant position.

3. The dockboard of claim 1, wherein said means for establishing communication is carried by said piston means.

4. The dockboard of claim 1, wherein said means for establishing communication comprises a slot in the rod and located to connect said conduit with the interior of said first cylinder when the piston means is adjacent said head.

5. The dockboard of claim 1, and including a check valve connecting said conduit and the interior of said first cylinder, said check valve permitting free flow of fluid from said conduit to the interior of said first cylinder but preventing flow in the opposite direction.

6. A hydraulically operated dockboard, comprising a supporting structure, a ramp structure hinged at its rear edge to the supporting structure and movable between a generally horizontal position and an upwardly inclined position, a lip hinged to the forward edge of the ramp structure and movable between a downwardly hanging pendant position and an outwardly extended position, a first hydraulic cylinder unit interconnecting the ramp structure and the supporting structure, means for supplying hydraulic fluid under pressure to said first cylinder unit to extend said first cylinder unit and elevate the ramp, means responsive to the ramp being elevated to a predetermined position for supplying pressurized fluid from the first cylinder unit to the second cylinder unit to pivot the lip to the extended position, said ramp being lowered by gravity to bring the extended lip into contact with the bed of a carrier located in front of the loading dock, the back pressure in said first cylinder unit acting to maintain the lip in the extended position as the ramp is lowered, and means responsive to arresting the descent of the ramp when the carrier pulls away from the dock and the lip is unsupported by the bed of the carrier for returning the fluid from the second cylinder unit to said first cylinder unit to enable the lip to pivot by gravity from the extended position to the pendant position.

7. A hydraulically operated dockboard, comprising a supporting structure, a ramp structure hinged at its rear edge to the supporting structure and movable from a generally horizontal position to an upwardly inclined position, a lip hinged to the forward edge of the ramp and movable between a downwardly hanging pendant position and an extended position, a first hydraulic cylinder unit interconnecting the supporting structure and the ramp structure and including a cylinder and a piston disposed within the cylinder and a piston rod connected to the piston and extending through an opening in a head of the cylinder, said cylinder being pivotally connected to one of said structures and said piston rod being pivotally connected to the other of said structures, a supply conduit connecting opposite ends of said cylinder, said head having a passage with the inner end of the passage communicating with said opening and the outer end being located at the exterior of the head, said piston rod normally closing the inner end of said passage, said piston rod having a longitudinal slot adjacemt said piston, a second cylinder unit interconnecting the ramp structure and the lip, a second conduit connecting the outer end of the passage and the second cylinder unit, supply means for supplying pressurized fluid through said supply conduit to the opposite ends of said cylinder to extend the piston rod and raise the ramp structure to the elevated position, movement of the piston rod toward the fully extended position moving said slot into fluid communication with said passage to thereby permit the pressurized fluid in said cylinder to flow through said second conduit to the second cylinder unit to extend said second cylinder unit and pivot the lip from the pendant position to the extended position.

8. The dockboard of claim 7, and including check valve means in said head interconnecting the passage and the interior of the cylinder for permitting free flow of fluid from said passage to the interior of the cylinder but preventing flow of fluid in the opposite direction, descent of the ramp structure from the elevated position causing retraction of said piston rod to move the slot out of fluid communication with said passage, arresting the descent of the ramp structure when the extended lip is unsupported causing the fluid to return from the second cylinder unit to said cylinder via said second conduit, said passage and said check valve means to thereby enable the lip to pivot by gravity to the pendant position.

9. A hydraulically operated dockboard, comprising a supporting structure, a ramp structure hinged at its rear edge to the supporting structure and movable from a generally horizontal position to an upwardly inclined position, a lip hinged to the forward edge of the ramp and movable between a downwardly hanging pendant position and an extended position, a first hydraulic cylinder unit interconnecting the supporting structure and the ramp structure and including a first cylinder and first piston means slidably disposed within the cylinder, said first cylinder being connected to one of said structures and said piston means being connected to the other of said structures, said piston means including a rod slidably disposed within an opening in a head of the first cylinder, a first conduit interconnecting opposite ends of said first cylinder, a reservoir for hydraulic fluid, a second conduit interconnecting said reservoir and said first conduit, pumping means operably connected to said reservoir for pumping fluid from the reservoir and through said second and first conduits to said first cylinder, a second hydraulic cylinder unit interconnecting the ramp structure and the lip, third conduit means connecting the first cylinder with said second cylinder unit and said third conduit means including a passage disposed in said head, said passage being normally closed to prevent flow of fluid from the interior of said first cylinder to said second cylinder unit, and means responsive to a predetermined amount of elevation of said ramp to open said passage and permit flow of fluid from said first cylinder through said passage and said third conduit means to the second cylinder unit to thereby extend said second cylinder unit and move the lip from the pendant position to the elevated position.

10. The dockboard of claim 9, and including a second passage connecting the first passage with the interior of the cylinder, and check valve means disposed in said second passage for preventing flow of fluid from the cylinder into said first passage and for permitting the flow of fluid in the opposite direction.

11. The dockboard of claim 9, wherein said means for opening the passage is connected to said piston means.

12. The dockboard of claim 9, wherein said means for opening the passage comprises a longitudinal slot in said rod.

13. A hydraulically operated dockboard, comprising a supporting structure, a ramp structure hinged at its rear edge to the supporting structure and movable between a generally horizontal position and an upwardly inclined position, a lip hinged to the forward edge of the ramp structure and movable between a downwardly hanging pendant position and an outwardly extended position, a first hydraulic cylinder unit interconnecting the ramp structure and the supporting structure and comprising a first cylinder and first piston means slidable within the cylinder, said first piston means includes a rod extending through a head of the first cylinder, said first cylinder being pivotally connected to one of said structures and said first piston means being pivotally connected to the other of said structures, a second hydraulic cylinder unit interconnecting the ramp structure and the lip, means for supplying hydraulic fluid under pressure to the first cylinder unit to extend said piston means and elevate the ramp structure, a conduit connecting the end of said first cylinder adjacent said head with the second cylinder unit, valve means disposed in said conduit for controlling the flow of fluid therethrough, and means responsive to said piston means moving to a predetermined position adjacent said head on elevation of said ramp structure for opening said valve means and supplying fluid from said first cylinder through said conduit to the second cylinder unit to thereby operate said second cylinder unit and pivot the lip from the pendant position to the extended position.

* * * * *